United States Patent Office 3,337,346
Patented Aug. 22, 1967

3,337,346
METHOD OF PAN FRYING FOWL
Thomas Dix Barker and Ethel Cox Barker, Banning, Calif.
(both of 123 Hamilton Ave., Silver Spring, Md. 20901)
No Drawing. Filed Feb. 10, 1967, Ser. No. 615,064
4 Claims. (Cl. 99—107)

ABSTRACT OF THE DISCLOSURE

Whole chickens, other fowl or small game are pan fried by a process which provides a thoroughly cooked food article with exceptional keeping qualities.

---

This application is a continuation-in-part of our co-pending United States patent applications Ser. No. 466,615 filed June 24, 1965 now abandoned, and Ser. No. 568,484 filed July 28, 1966.

This invention relates to the preparation of pan fried chicken, particularly whole chickens, pan fried rabbits, quail, or other pan fried game or fowl, whether in the form of small pieces or as the whole fowl or animal.

For purposes of illustration, the invention will be described as it relates to the preparation of pan fried whole 2½ pound chicken, but it is to be understood that the preparation of pan fried rabbit, quail, or other fowl is substantially identical with the preparation of the chicken, except for variations in seasoning or cooking time and that the apparatus described in our earlier applications, or any other suitable apparatus may be used for automatically preparing food other than chicken, whether in the form of whole fowl or animal or as pieces thereof.

Pan fried chicken is not new and has been prepared by a variety of procedures directed generally to producing an attractive evenly browned product. Unless special precautions are taken, the pan fried chicken is often dry to the taste and/or greasy to the touch and hence is less than ideal for many individuals' personal tastes. As it has heretofore been prepared, pan fried chicken has a staying quality of thirty minutes, after which it loses its succulence and becomes dried and unpalatable.

The present invention provides a technique and apparatus whereby juicy, succulent, evenly browned and virtually greaseless chickens are made available quickly and uniformly cooked with good keeping qualities in a completely automatic manner in 12 to 15 minutes.

The chicken that is cooked by this method may be kept refrigerated for thirty days or longer and then reheated to produce a product which is indistinguishable from freshly cooked pan fried chicken, as regards color, succulence and flavor.

Briefly the process comprises the following sequence of steps, each of which will be explained in detail:

(1) Washing and soaking;
(2) Seasoning and flouring;
(3) Cooking in oil; and
(4) Post cooking treatment with water.

As described in our earlier filed applications, assuming that dressed poultry is available, the first of the above steps consists of washing and soaking the chicken in clean tap water. Whether the chicken is whole or cut up in pieces, this part of the process is conducted so as to remove any foreign matter from the surfaces of the chickens or pieces of chicken. After washing to remove any foreign matter, the whole chickens or individual pieces of chicken are placed in tubs or trays into which enough tap water is poured to cover the chickens. The tub or tray and its contents are placed in a cool place, e.g. refrigerated space maintained at between about 35° F. and 45° F. The blood and any chemicals used to preserve the chicken soak out into the water which becomes discolored. From time to time, e.g. every 3 to 4 hours, or more frequently if desired, the water in the tray is discarded and is replaced with fresh tap water, until the tap water is no longer discolored after soaking for the selected time interval. Usually the washing and soaking portion of the process extends for a period of time sufficient for the cells of the chicken to become thoroughly saturated with water and for the water to replace the body fluids in the circulatory system of the chicken. As a consequence, the clean water distributed throughout the chicken materially assists in evenly cooking the chicken to a tender product. Furthermore, the soaking replenishes any liquids lost from the chicken when it was dressed due to drying out in normal handling.

The soaked chicken is then seasoned and then rolled in flour. The particular blend of seasonings used may be varied without departing from the invention and will be varied in accordance with the local preference. About twice the usual amount of seasoning is placed on the chicken. The seasoning is placed directly on the chicken and due to the amount of water the seasoning will be completely absorbed by the chicken at the time of application or during the cooking and due to the water in the chicken the seasoning penetrates to the bone. The flour is believed to contribute to the retention of liquids in the chicken and to even browning and crusting of the chicken.

As described in our earlier application Ser. No. 568,484, an apparatus for automatically cooking the chicken, the cooking oil is pumped into the pan when a starter button is pressed and heaters are also turned on. The cooking oil or fat is introduced into a shallow pan, the oil or fat being at room temperature or slightly above room temperature, e.g. 100° F., so that it is a liquid. The amount of fat or oil used must be just sufficient to half cover the chicken. The seasoned and floured chickens to be cooked are then placed into the shallow pan, preferably supported on holders which cause the chickens to rotate as they cook in the oil. The pan is then covered and the heat is applied under the pan, so that the oil is brought to its boiling point quickly. The chicken is cooked in the boiling oil for about 6 to 8 minutes or until it is seen to be a golden brown color.

Because the chicken is saturated with water, the oil cannot penetrate into the chicken which remains moist, but does not become greasy beneath the crust, although the water conducts the heat from the oil directly to the bones in the chicken.

When the chicken reaches the desired color, the oil or fat in the pan is drained off, and to avoid warping the pan, the burners are turned off too. In automatic operation, the burners are thermostatically controlled and remain on only long enough to maintain the cooking oil at the desired cooking temperature. When the chicken cooking cycle is complete, the oil is pumped from the pan, by a timer controlled mechanism. Immediately after the oil has drained from the pan, tap water is sprayed onto the chicken for about 1 to 2 seconds, without removing the cover. When the water hits the hot chicken, an intense moist heat is quickly produced within the space enclosed by the pan and cover. The intense heat and moisture causes the excess fat to flow from the crust of the chicken, softens the crust without leaving it soggy, completes the penetration of the seasoning throughout the chicken from the crust to the bone, and further tenderizes the chicken. At the end of the very brief moisturizing period any liquid water and/or fat present is drained off and the resulting product is ready to eat.

It has been found that the water spray applied at the particular time specified in the particularly specified manner to the properly processed chicken invariably produces a pan fried chicken which is juicy and succulent, free from excess cooking oils, seasoned evenly from crust to bone, lower in calories than average fried chicken, more easily digested because of lower fat content, and very hot and tender as it comes from the pan, ready to eat.

To process the chickens as described above, use may be made of the cooking apparatus described in our copending applications, the disclosures of which are incorporated herein by reference, or any other suitable apparatus.

It is believed that throughout the process water plays an important part. Thus the soaking causes the chicken tissues to become completely filled with clean water so that when the water is heated within the tissues it produces an expansion of the tissues—breaking down the sinews and preventing drying out which causes toughness. The pieces of chicken retain a large portion of the clean water in the final soaking step and this retained water causes the seasoning to penetrate evenly throughout the pieces of chicken. This water also causes the chicken to cook evenly all the way to the bone because the heated water carries the heat to all parts of the chicken at the same time as the temperature of the outside of the chicken is increased in the cooking step.

It is also important that the chicken be placed in cooking oil which is warm to the touch and which is at a temperature not greatly in excess of 100° F. The cooking oil and the surface of the chicken are heated at the same time and to the same temperature. The water inside the chicken heats evenly throughout the chicken at the same time. Therefore, the chicken is never any less cooked at the bone than it is at the surface. The seasoning is uniform in each bite. The chicken retains its moisture because the temperature of the water, meat, and cooking fat are all the same and hence the moisture is not driven off as in many other cooking processes.

The present invention is not to be confused with the invention described in United States Patent 1,256,955 issued to Charles B. Trescott Feb. 19, 1918, in which the juices in steam cooked hams, cooked at relatively low temperatures (140° F. to 150° F.), are set by cooling the cooked hams to about 55 to 60° F. by spraying the cooked hams with cooling water. First of all, the hams are not pan fried in hot oil. They are not soaked in water prior to cooking. They are not covered with flour, and they are not cooked at the same temperature as fowl or game processed in the present invention. Finally, instead of a very brief spray to remove residual cooking oil (absent from Trescott), Trescott has an extended cooling treatment to set the juices in his low temperature cooked foods.

Having now described the invention, it is not intended that it be limited except as may be required by the appended claims.

We claim:
1. A method of pan frying edible food selected from the group consisting of fowl and game comprising the following sequence of steps:
    (a) washing and soaking said food in clean water until the water is no longer discolored;
    (b) seasoning said food after it has been thoroughly saturated with water;
    (c) flouring the seasoned food;
    (d) placing said food in a pan containing cooking oil at a temperature not greatly in excess of 100° F.;
    (e) applying heat to the pan and its contents to rapidly pan fry the food;
    (f) draining the oil from the pan when the outer surface of the food is brown; and
    (g) immediately thereafter spraying the browned food with a fine spray of water to remove excess cooking oil while the browned food is still warm.

2. The method of claim 1 wherein the food is a whole chicken after it has been cleaned.

3. The method of claim 1 wherein the food consists of small pieces of fowl or game.

4. In a method of pan frying chicken in which said chicken is browned in a pan containing a cooking oil, the improvement which comprises: soaking the chicken in water to saturate it before cooking, browning and cooking the chicken in oil, draining the oil from the cooking pan, and then immediately applying a fine spray of water to the chicken, whereby excess cooking oil is removed from the browned chicken while it retains the heat of the browning operation.

References Cited

UNITED STATES PATENTS

| 1,256,955 | 2/1918 | Trescott | 99—107 |
| 2,709,658 | 5/1955 | Buchanan | 99—194 |

OTHER REFERENCES

Farmer, "The Boston Cooking-School Cook Book," 145, published by Garden City Publishing Co., Inc., New York, page 375, article entitled Fried Chicken. Copy in Group 172, U.S. Pat. Off.

Given, "Modern Encyclopedia of Cooking," vol. 2, 1949, published by J. G. Ferguson and Associates, Chicago, page 1198, article entitled Fried Chicken. Copy in Group 172, U.S. Pat Off.

H. LORD, *Primary Examiner.*